United States Patent [19]

Mutoh

[11] Patent Number: 4,945,418
[45] Date of Patent: Jul. 31, 1990

[54] SOLID STATE IMAGE PICKUP APPARATUS WITH CHARGE STORAGE DEVICE

[75] Inventor: Hideki Mutoh, Kanagawa, Japan

[73] Assignee: Fuji Photo Film Co., Ltd., Kanagawa, Japan

[21] Appl. No.: 304,081

[22] Filed: Jan. 31, 1989

[30] Foreign Application Priority Data

Feb. 1, 1988 [JP] Japan .................................. 63-19678

[51] Int. Cl.$^5$ ................................................. H04N 3/14
[52] U.S. Cl. ............................ 358/213.11; 358/213.31
[58] Field of Search ...................... 358/213.11, 213.12, 358/213.22, 212, 909, 213.31

[56] References Cited

U.S. PATENT DOCUMENTS

| | | | |
|---|---|---|---|
| 4,363,963 | 12/1982 | Ando | 358/212 |
| 4,382,187 | 5/1983 | Fraleux et al. | 358/213.11 |
| 4,471,228 | 9/1984 | Nishizawa et al. | 358/213.12 |
| 4,472,638 | 9/1984 | Nishizawa et al. | 358/213.12 |
| 4,499,384 | 2/1985 | Segawa | 358/213.11 |
| 4,518,863 | 5/1985 | Fukuoka et al. | 358/213.12 |
| 4,542,409 | 9/1985 | Ochi | 358/212 |

*Primary Examiner*—Stephen Brinich
*Attorney, Agent, or Firm*—Sughrue, Mion, Zinn, Macpeak & Seas

[57] ABSTRACT

A solid state image pickup device is provided in which a photodiode photoelectrically converts incident light to a voltage. Next a transistor performs voltage-to-current conversion, and a capacitor stores the charge. Current is stored in the capacitor without requiring the application of a reverse bias voltage to the photodiode. The voltage generated across the photodiode is logarithmically related to the quantity of incident light, and the dynamic range of the input signal to be reproduced is increased. As a result, dark current is minimized and dark current noise is reduced.

15 Claims, 4 Drawing Sheets

SOLID STATE IMAGE PICKUP APPARATUS WITH CHARGE STORAGE DEVICE

BACKGROUND OF THE INVENTION

1. Field of the Invention

The present invention relates generally to a solid state image pickup device characterized by a charge storage device, and in particular relates to a technique for increasing the dynamic range of a voltage signal generated from a light reception element and for reducing dark current.

2. Description of the Prior Art

A solid state image pickup device has been used as an image pickup element of an electronic camera or a VTR. Such a solid state image pickup device is described in "SOLID STATE IMAGE PICKUP DEVICE", published by Syokodo Publishing Co., Ltd., July 30, 1986. Particularly, the fundamental concept of the solid state image pickup device is described on pages 6 to 13, the photodiode acting as a light reception element and the charge storage action are described on pages 56 to 59 and the arrangement is described on pages 82 to 102.

FIGS. 8 and 9 are a circuit diagram and a block diagram, respectively, showing an example of the conventional solid state image pickup device. A photodiode PD, which is a light reception element, is arranged to discharge a charge corresponding to the quantity of light hv. The quantity of charge discharged from the photodiode PD during a predetermined time period is proportional to the stored quantity of light hv incident on the photodiode PD during the predetermined time period. Although a charge storage capacitor Cs is illustrated as a single independent capacitor, the charge storage capacitor Cs actually comprises a junction capacitance formed together with the photodiode PD to temporarily store the aforementioned charge and to thereby obtain a photoelectrically converted electric signal which is read by a read-out circuit 3 in the succeeding stage.

A MOS transistor Tr1 (hereinafter referred to as a "transistor") performs an ON/OFF operation in response to a Cs reset pulse $\phi_{RS}$ applied to the gate of the transistor Tr1. As a result, the charge storage capacitor Cs is reset and a reverse bias voltage is applied to the photodiode PD.

When an image is obtained by the conventional solid state image pickup device, it is desirable to improve the obtained picture quality by increasing the dynamic range of the photoelectrically converted electric signal and by reducing dark current noise. However, efforts to increase the dynamic range and to reduce dark current noise have resulted in the following problem.

Specifically, in the conventional solid state image pickup device, a reverse bias voltage is applied to the photodiode PD as described on page 56 of the foregoing "SOLID STATE IMAGE PICKUP DEVICE", and the transistor TR1 is turned on in the circuit of FIG. 8. When a reverse bias voltage is applied, increasing the dynamic range in photoelectric conversion and reducing dark current noise is difficult because the operational range of the photodiode PD is narrow and the generation of a dark current cannot be suppressed.

SUMMARY OF THE INVENTION

It is therefore an object of the present invention to solve the foregoing problem in the prior art.

It is another object of the present invention to provide a solid state image pickup device in which the dynamic range of a photoelectrically converted electric signal is increased and dark current noise is reduced.

The solid state image pickup device according to the present invention is arranged so that a photodiode acting as a light reception element performs a photoelectric conversion without the application of a reverse bias voltage. In addition, a voltage-to-current conversion transistor for obtaining a current corresponding to a voltage across the electrodes of the photodiode is provided and controls a signal charge to be produced as a photoelectrically converted electric signal.

In the foregoing arrangement, the photodiode performs the photoelectric conversion operation without being reversely biased. Accordingly, the dynamic range of the voltage across the electrodes of the photodiode and the dynamic range of the photoelectrically converted electric signal can be increased and dark current can be reduced to thereby improve the quality of an image obtained by the solid state image pickup device.

BRIEF DESCRIPTION OF THE DRAWINGS

These and other features, objects and advantages of the present invention will be apparent from the following detailed description with reference to the accompanying drawings in which.

DETAILED DESCRIPTION OF THE PREFERRED EMBODIMENTS

Embodiments of the solid state image pickup device according to the present invention will be described with reference to the accompanying drawings.

Figure 1:
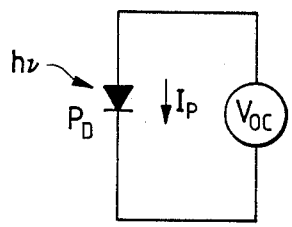
FIGS. 1 through 3 are circuit diagrams for explaining the fundamental principle, arrangement and operation of the solid state image pickup device according to the present invention.

First, referring to FIG. 1, the fundamental principle of the present invention will be described.

If an opened-state photodiode PD is irradiated with light having a quantity of hv, a voltage Voc generated across the electrodes of the photodiode PD is obtained from the following expression (1).

$$Voc = \frac{kT}{q} \log\left(\frac{Ip}{Io} + 1\right) \tag{1}$$

where q represents a charge, T represents a temperature, k is Boltzmann's constant, Ip is an electric current caused by the photodiode PD when the photodiode is irradiated with light having a quantity of hv, and Io is a saturation current of the photodiode PD.

From the expression (1), Voc ∝ Ip when Ip<<Io, and Voc ∝ log Ip when Ip>>Io.

If the photodiode PD operates without the application of a reverse bias voltage, a large dynamic range can be obtained by converting a change in the voltage Voc into a change in the current and by time quadrature of the current. In a dark time, no potential difference is generated across the electrodes of the photodiode PD, so that the dark current is minimal.

Figure 2:
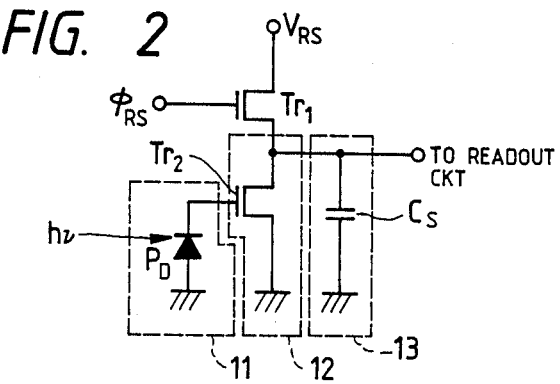
Figure 3:
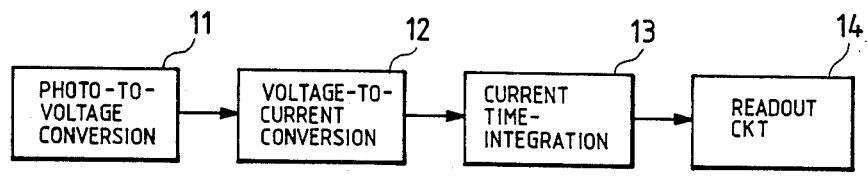

Next, referring to FIGS. 2 and 3, the circuit operation from photoelectric conversion to signal reading will be described.

The level of the voltage Voc across the electrodes of the photodiode PD changes corresponding to the quantity of light hv incident on the photodiode PD. The voltage Voc is applied to a voltage-to-current conversion transistor Tr2 as a gate voltage.

The drain-source current of the transistor Tr2 therefore corresponds to the voltage Voc across the electrodes of the photodiode PD so that the voltage-to-current conversion is performed. A charge stored in a charge storage capacitor Cs is controlled by the drain-source current, and a time-quadrature output signal is read out from the charge storage capacitor Cs by a read-out circuit 14. A junction capacitance formed together with the source of a transistor Tr1 and the drain of the transistor Tr2 may be used as the charge storage capacitor Cs, so that the foregoing arrangement can be realized without requiring an independent capacitor.

Importantly, in the present invention, no reverse bias voltage is applied to the photodiode PD while current is being stored in the charge storage capacitor Cs. Therefore, the voltage Voc across the electrodes of the photodiode PD is related to a large quantity of light by a logarithmic relation, so that the dynamic range of an input signal to be reproduced is increased. Further, dark current is not generated in the photodiode PD, so that current noise is reduced. A diode formed of a lamination of a-si (amorphous silicon) or the like may be used as the photodiode PD. The polarity of the photodiode PD can be changed in accordance with the output characteristic, for example, a negative output characteristic or a positive output characteristic.

Next referring to FIGS. 4 through 7, applications of the foregoing solid state image pickup device of the present invention will be described.

Figure 4:
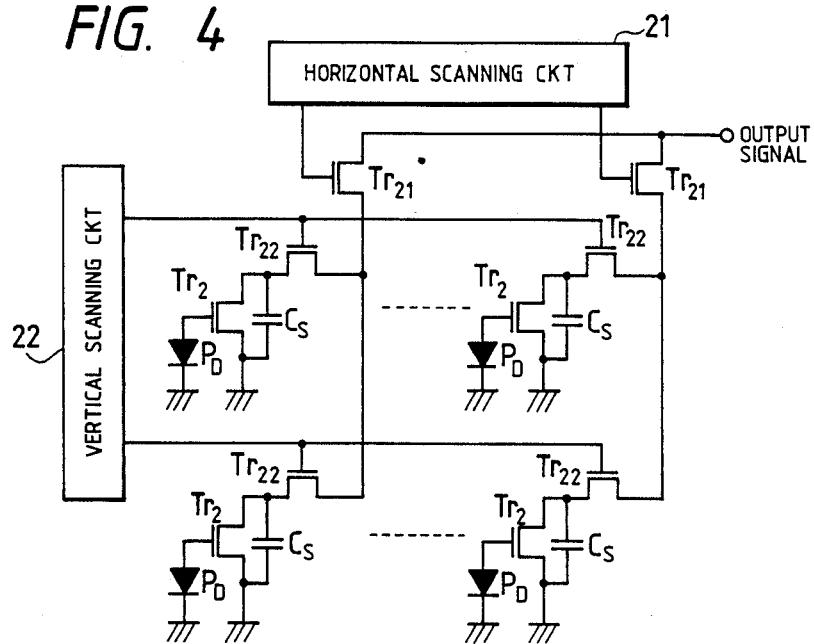
FIGS. 4 through 7 are circuit diagrams showing applications of the solid state image pickup device according to the present invention.

FIG. 4 shows an example of a MOS sensor-type solid state image pickup device to which the present invention has been applied. In the example, photodiodes PD, voltage-to-current conversion transistors Tr2, and charge storage capacitors Cs operate in the same manner as in the first embodiment.

A horizontal scanning circuit 21 successively drives transistors Tr21 to obtain an output signal of one horizontal scanning period on the basis of the voltages generated from the photodiodes PD. A vertical scanning circuit 22 drives transistors Tr22 successively in the vertical direction after completion of one horizontal scanning period to thereby obtain the output signal.

In the configuration, therefore, it is possible to obtain an output signal exhibiting a large dynamic range and minimal dark current.

Figure 5:
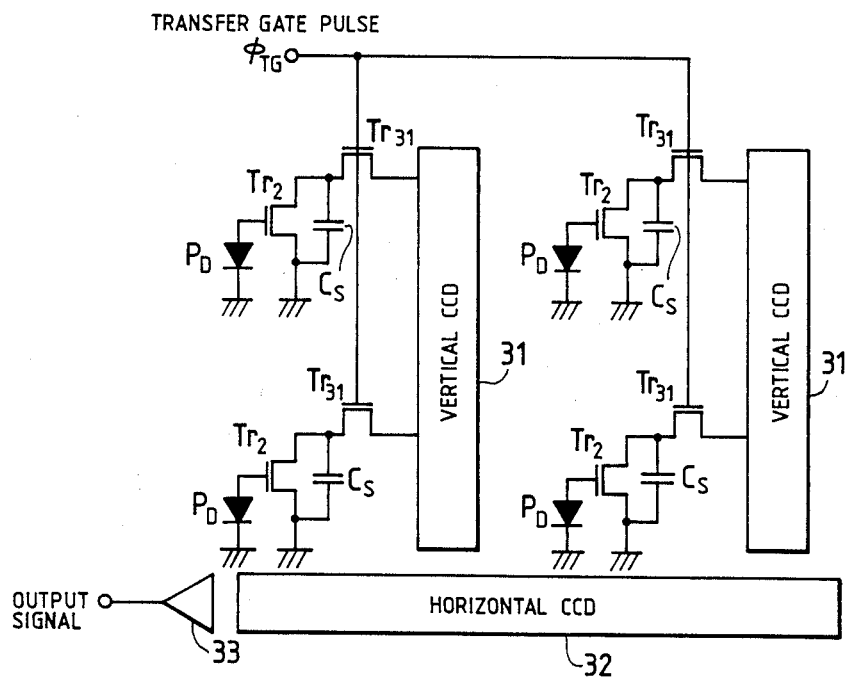

FIG. 5 shows the application of the present invention to an IL (interline)-CCD (charge coupled device) type solid state image pickup device, in which photodiodes PD, voltage-to-current conversion transistors TR2, and charge storage capacitors Cs operate in the same manner as in the first embodiment. In response to a transfer gate pule $\phi_{TG}$, transistors Tr31 transfer the signal charges generated from the corresponding photodiodes PD and stored in the corresponding charge storage capacitors Cs into corresponding vertical CCDs 31.

The respective vertical CCDs 31 vertically transfer theeir signal charges column by column to a horizontal CCD 32. The horizontal CCD 32 horizontally transfers the received signal charges.

As a result, the output signal obtained from a buffer amplifier 33 has a large dynamic range and a small dark current, similar to the above example.

Figure 6:
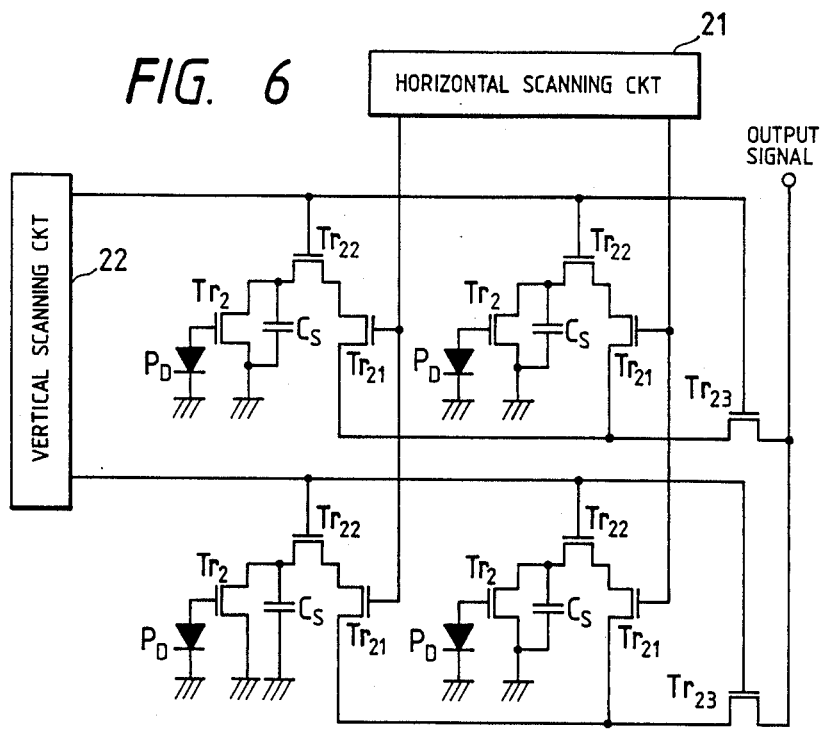
Figure 8:
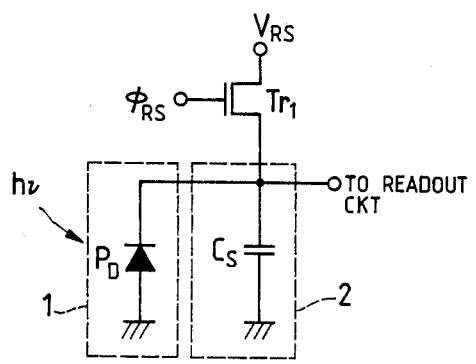
FIGS. 8 and 9 are circuit diagrams showing an example of the conventional solid state image pickup device.
Figure 9:
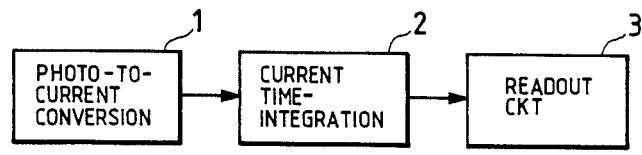

FIG. 6 shows the application of the present invention to a TSL type (horizontal read-out transfer type) solid state image pickup device. In the application, the photodiodes PD, voltage-to-current conversion transistors Tr2, and charge storage capacitors Cs operate in the same manner as in the first embodiment.

The applicatiion is similar to the MOS sensor-type solid state image pickup device of FIG. 4. However, in the TSL type device, transistors Tr21, driven by a horizontal scanning circuit 21, are provided. This results in an output with reduced switching noise from the horizontal scanning transistors and less smear.

Figure 7:
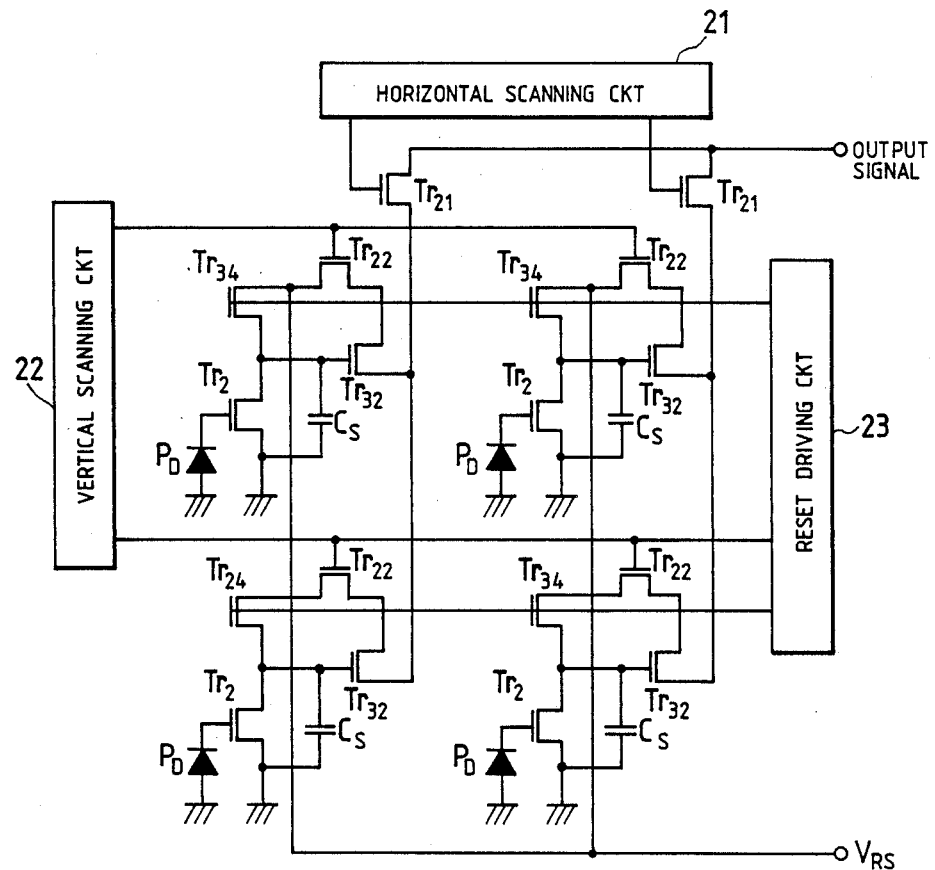

FIG. 7 shows the application of the present invention to an amplification type solid state image pickup device. Again, photodiodes PD, voltage-to-current conversion transistors Tr2, and charge storage capacitors Cs operate in the same manner as in the first embodiment.

In this example, the respective outputs corresponding to the signal charges stored in the corresponding capacitors Cs are amplified by corresponding transistors Tr32 and produced as respective output signals through corresponding transistors Tr21.

Further, a reset drive circuit 23 and reset transistors Tr34 are arranged to reset the respective charge storage capacitors Cs after completion of one horizontal scanning period.

As described above, the solid state image pickup device to which the present invention has been applied can be widely used regardless of the type of the read-out circuit.

In addition, in the solid state image pickup device according to the present invention, a photodiode acting as a light reception element performs photoelectric conversion without the application of a reverse bias voltage. Moreover, the photodiode and transistor for performing voltage-to-current conversion are driven by a voltage across the electrodes of the photodiode having a logarithmic characteristic so that an output signal corresponding to time quadrature of a current is obtained from a charge storage capacitor. Therefore, the dynamic range of the voltage across the electrodes as well as the dynamic range of the output signal are increased, and dark current is reduced.

Accordingly, the picture quality obtained by the solid state image pickup device of the present invention can be greatly improved.

I claim:

1. A solid state image pickup device, comprising:
   a photodiode for receiving incident light and for performing photoelectric conversion of said incident light;
   a first transistor coupled to said photodiode for converting a voltage produced across said photodiode into an electric current; and
   a charge storage capacitor for storing an electric charge in response to said electric current,
   wherein said electric charge is stored in said charge storage capacitor with exclusive application of forwardly biased voltage to said photodiode.

2. A solid state image pickup device as claimed in claim 1, further comprising a second transistor coupled to said first transistor, said second transistor being responsive to a reset signal.

3. A solid state image pickup device as claimed in claim 2, wherein said charge storage capacitor comprises a junction capacitance formed with the drain of said first transistor and the source of said second transistor.

4. A solid state image pickup device as claimed in claim 1, wherein said stored electric current is read by a read-out circuit.

5. A solid state image pickup device as claimed in claim 4, wherein said read-out circuit is a MOS sensor-type device.

6. A solid state image pickup device as claimed in claim 4, wherein said read-out circuit is an interline charge coupled device type device.

7. A solid state image pickup device as claimed in claim 4, wherein said read-out circuit is a horizontal read-out transfer type device.

8. A solid state image pickup device as claimed in claim 4, wherein said read-out circuit is an amplification type device.

9. A solid state image pickup device, comprising:
   means for converting irradiated light to a voltage level;
   means for converting said voltage level to a current signal;
   means for extracting an output signal corresponding to time quadrature of said current signal; and
   means for reading out said output signal.

10. A solid state image pickup device as claimed in claim 9, wherein said means for converting irradiated light to a voltage level is a photodiode.

11. A solid state image pickup device as claimed in claim 9, wherein said means for converting said voltage level to a current signal is a transistor.

12. A solid state image pickup device as claimed in claim 10 wherein said means for converting said voltage level to a current signal is a transistor coupled to said photodiode.

13. A solid state image pickup device as claimed in claim 9, wherein said means for providing an output signal corresponding to time quadrature of said current signal is a charge storage capacitor.

14. A solid state image pickup device, comprising:
    a source of a reset signal;
    a diode, responsive to light, having first and second terminals;
    a first transistor having a source, drain, and gate, said first terminal of said diode being connected to said gate; and
    a capacitance formed across said source and drain, said capacitance being connected to a readout terminal, and electric charge of said capacitance being stored with exclusive application of forwardly biased voltage to said diode.

15. A solid state image pickup device as claimed in claim 14, further comprising:
    a second transistor having a source, drain, and gate, said gate being connected to said source of a reset signal, and one of said source or drain being connected to one of the drain or source, respectively, of said first transistor,
    wherein said capacitance comprises the junction capacitance formed at the junction of the source of one of said first and said second transistors, and the drain of the other of said first and second transistors.

* * * * *